(12) United States Patent
Dai et al.

(10) Patent No.: US 11,946,908 B2
(45) Date of Patent: Apr. 2, 2024

(54) METHOD FOR CONSTRUCTING SURFACE STRESS DISTRIBUTION CLOUD MAP BASED ON CRITICAL REFRACTION LONGITUDINAL WAVE DETECTION

(71) Applicants: Beijing Precision Machinery & Engineering Research Co., Ltd., Beijing (CN); Beijing University Of Technology, Beijing (CN)

(72) Inventors: Yuhong Dai, Beijing (CN); Nana Niu, Beijing (CN); Zuguang Huang, Beijing (CN); Junyan Xing, Beijing (CN); Xiaofeng Zhu, Beijing (CN); Huiling Ren, Beijing (CN); Heqiang Liu, Beijing (CN); Dequan Wang, Beijing (CN); Yaru Hou, Beijing (CN); Xiaoqin Hao, Beijing (CN)

(73) Assignees: Beijing Precision Machinery & Engineering Research Co., Ltd., Beijing (CN); Beijing University Of Technology, Beijing (CN)

( * ) Notice: Subject to any disclaimer, the term of this patent is extended or adjusted under 35 U.S.C. 154(b) by 0 days.

(21) Appl. No.: 18/473,251

(22) Filed: Sep. 24, 2023

(65) Prior Publication Data
US 2024/0011948 A1    Jan. 11, 2024

(30) Foreign Application Priority Data
Dec. 21, 2022 (CN) .......................... 202211651243.2

(51) Int. Cl.
*G01N 29/44* (2006.01)

(52) U.S. Cl.
CPC .................................. *G01N 29/44* (2013.01)

(58) Field of Classification Search
CPC ...................................................... G01N 29/44
See application file for complete search history.

(56) References Cited

U.S. PATENT DOCUMENTS

| | | | |
|---|---|---|---|
| 6,415,486 B1 * | 7/2002 | Prevey, III .............. | B24B 55/02 29/90.01 |
| 7,219,044 B1 * | 5/2007 | Prevey ..................... | G06F 30/00 703/7 |

(Continued)

OTHER PUBLICATIONS

Catagoliola et al. '2D model for fraction of complex anisotropic surface', Jan. 2018, Elsevier Publication, pp. 1-24 (Year: 2018).*

(Continued)

*Primary Examiner* — Elias Desta
(74) *Attorney, Agent, or Firm* — Zhigang Ma

(57) ABSTRACT

The present invention discloses a method for constructing a surface stress distribution cloud map based on critical refraction longitudinal wave detection. The method comprises: firstly, meshing a surface of a detected article; secondly, The mean transverse stress on different grid lines and the mean longitudinal stress on different grid lines were obtained by the critical refraction longitudinal wave detection method; next, calculating the equivalent stress of each mesh node according to the mean transverse stress on different mesh transverse lines and the mean longitudinal stress on different mesh longitudinal lines on the surface of the detected article; and finally, drawing a stress distribution cloud map of the surface of the detected article according to the equivalent stress. The present invention can obtain the stress situations at different points on the surface of the detected article.

4 Claims, 2 Drawing Sheets

(56) References Cited

U.S. PATENT DOCUMENTS

| | | | |
|---|---|---|---|
| 7,941,307 B2 * | 5/2011 | Symington | E21B 49/006 703/10 |
| 8,442,780 B2 * | 5/2013 | Lu | G01N 3/12 600/587 |
| 2013/0156292 A1 | 6/2013 | Chang et al. | |
| 2019/0004844 A1 | 1/2019 | Zhang et al. | |
| 2019/0164231 A1 | 5/2019 | Tang et al. | |

OTHER PUBLICATIONS

CNIPA, Notification of First Office Action for Chinese application CN202211651243.2, dated Jun. 8, 2023.
CNIPA, Notification to grant patent right for Chinese application CN202211651243.2, dated Jul. 19, 2023.

* cited by examiner

METHOD FOR CONSTRUCTING SURFACE STRESS DISTRIBUTION CLOUD MAP BASED ON CRITICAL REFRACTION LONGITUDINAL WAVE DETECTION

TECHNICAL FIELD

The present invention belongs to the field of construction machinery assembly and stress ultrasonic detection, and relates to a method for constructing a surface stress distribution cloud map based on critical refraction longitudinal wave detection.

BACKGROUND

In the assembling process of mechanical parts, under the combined influence of geometrical parameters and the elastic interaction of an assembly pretightening force, nonuniform distribution of surface stress is easy to be caused, which has become an important scientific issue that restricts the mechanical properties and accuracy of product connection. The current research mainly focuses on the formation mechanism and the detection method of surface stress. However, considering the geometrical parameters such as dimensional error, form and position errors and interface deformation, and the influence of physical parameters such as material properties and assembly environment, a theoretical model of nonuniform distribution of surface stress with high prediction accuracy has not been formed so far. Therefore, the equipment manufacturing industry urgently needs to break through the surface stress detection technology of assembly structures.

The traditional structural surface stress detection methods mainly include some destructive testing methods such as profile method and orifice method, which may cause irreversible damage to the structure itself; and surface detection methods such as magnetic attraction method and x-ray method, which have the problems of detection limitations and detection accuracy. The existing detection methods based on ultrasonic critical refraction longitudinal waves can only detect the mean stress value of the plane of a substance to be measured, and cannot accurately obtain the stress distribution situation of the substance to be measured when the surface stress distribution is uneven. Therefore, it is particularly important to research a method for constructing a surface stress distribution cloud map based on critical refraction longitudinal wave detection.

SUMMARY

In view of this, the present invention provides a method for constructing a surface stress distribution cloud map based on critical refraction longitudinal wave detection for solving the technical problems in the background.

To achieve the above purpose, the present invention adopts the following technical solution:

The present invention constructs a surface stress distribution cloud map based on the critical refraction longitudinal wave detection, formulates a mesh detection solution for the surface stress of the structure of the detected article for scanning the meshes on the surface of the detected article to obtain the transverse and longitudinal stress values on each mesh node, and obtains the equivalent stress values of the mesh nodes through a Von Mises stress calculation formula. The present invention writes a script file based on Matlab software language and draws an uneven surface stress distribution cloud map of the detected article. The present invention compares the calculation result of the equivalent stress value with the detection result of the strain gauge to verify the correctness of the calculation result of the stress values of the mesh nodes.

The present invention is realized by the following technical means: a method for constructing a surface stress distribution cloud map based on critical refraction longitudinal wave detection comprises the following steps:

S1, meshing a surface of a detected article, wherein meshes comprise a plurality of mesh transverse lines, a plurality of mesh longitudinal lines, and mesh nodes composed of the plurality of mesh transverse lines and the plurality of mesh longitudinal lines;

S2, acquiring a mean transverse stress on different mesh transverse lines and a mean longitudinal stress on different mesh longitudinal lines on the surface of the detected article respectively by a critical refraction longitudinal wave detection method according to the meshes divided on the surface of the detected article;

S3, calculating the equivalent stress of each mesh node according to the mean transverse stress on different mesh transverse lines and the mean longitudinal stress on different mesh longitudinal lines on the surface of the detected article;

S4, drawing a stress distribution cloud map of the surface of the detected article according to the equivalent stress of each mesh node.

In one embodiment, in step S2, acquiring a mean transverse stress on different mesh transverse lines and a mean longitudinal stress on different mesh longitudinal lines on the surface of the detected article respectively by a critical refraction longitudinal wave detection method specifically comprises:

detecting the transverse propagation duration of critical refraction longitudinal waves on different mesh transverse lines on the surface of the detected article by the critical refraction longitudinal wave detection method;

calculating the mean transverse stress on the corresponding mesh transverse lines according to the transverse propagation duration of the critical refraction longitudinal waves on different mesh transverse lines, with a specific calculation formula as follows:

$$\sigma_1 = B(t_1 - t_0) + \sigma_0$$

in the formula, $\sigma_1$ represents the corresponding mean transverse stress on a mesh transverse line, $t_1$ represents the transverse propagation duration of the critical refraction longitudinal wave on the mesh transverse line, B represents a stress-acoustic time difference coefficient corresponding to the detected article, $t_0$ represents the critical refraction longitudinal wave propagation duration corresponding to the detected article under a zero stress state, and $\sigma_0$ represents a zero stress corresponding to the detected article;

detecting the longitudinal propagation duration of critical refraction longitudinal waves on different mesh longitudinal lines on the surface of the detected article by the critical refraction longitudinal wave detection method;

calculating the mean longitudinal stress on the corresponding mesh longitudinal lines according to the longitudinal propagation duration of the critical refraction longitudinal waves on different mesh longitudinal lines, with a specific calculation formula as follows:

$$\sigma_2 = B(t_2 - t_0) + \sigma_0$$

in the formula, $\sigma_2$ represents the corresponding mean longitudinal stress on a mesh longitudinal line, $t_2$ represents the longitudinal propagation duration of the critical refraction longitudinal wave on the mesh longitudinal line, B represents a stress-acoustic time difference coefficient corresponding to the detected article, $t_0$ represents the critical refraction longitudinal wave propagation duration corresponding to the detected article under the zero stress state, and $\sigma_0$ represents the zero stress corresponding to the detected article.

In one embodiment, before step S2, the method further comprises the following steps:

acquiring a zero stress specimen of the same material as the detected article;

arranging a transmitting probe and a receiving probe for critical refraction longitudinal wave detection on the surface of the zero stress specimen, and installing a wedge block of the transmitting probe and a wedge block of the receiving probe;

conducting a tensile test for the zero stress specimen to obtain an ultrasonic acoustic time-load relationship curve under different loads, and obtaining a stress-acoustic time difference coefficient corresponding to the zero stress specimen according to the ultrasonic acoustic time-load relationship curve, wherein the stress-acoustic time difference coefficient corresponding to the zero stress specimen is the stress-acoustic time difference coefficient corresponding to the detected article;

conducting the critical refraction longitudinal wave detection of the zero stress specimen again to obtain the critical refraction longitudinal wave propagation duration corresponding to the zero stress specimen under the zero stress state, wherein the critical refraction longitudinal wave propagation duration corresponding to the zero stress specimen is the critical refraction longitudinal wave propagation duration corresponding to the detected article under the zero stress state.

In one embodiment, step S3 specifically comprises:

solving the equivalent stress of each mesh node by a Von Mises stress formula according to the mean transverse stress on different mesh transverse lines and the mean longitudinal stress on different mesh longitudinal lines on the surface of the detected article, with a specific formula as follows:

$$\sigma = \left[\frac{1}{2}(\sigma_1 - \sigma_2)^2 + (\sigma_2 - \sigma_3)^2 + (\sigma_3 - \sigma_1)^2\right]^{\frac{1}{2}}$$

in the formula, $\sigma$ represents the equivalent stress value of a mesh node, $\sigma_1$ represents the mean transverse stress corresponding to the mesh transverse line of the mesh node, $\sigma_2$ represents the mean longitudinal stress corresponding to the mesh longitudinal line of the mesh node, $\sigma_{,3}$ represents the stress of the mesh node perpendicular to the direction of the surface of the detected article, and the value of $\sigma_{,3}$ is zero.

Preferably, in one embodiment, before step S4, the method further comprises:

detecting the true stress value of each mesh node on the surface of the detected article by a strain gauge, and verifying the equivalent stress corresponding to each mesh node according to the true stress value. Only when an error between the true stress value of each network node and the equivalent stress value of the node satisfies a set threshold, the network node is drawn into the surface stress distribution cloud map of the detected article.

In one embodiment, step S4 specifically comprises:

drawing the stress distribution cloud map of the surface of the detected article by using Matlab software and according to the obtained equivalent stress of each mesh node.

Compared with the prior art, the present invention considers the characteristic of uneven stress distribution of the detected surface, formulates the mesh detection solution for the surface stress of the structure of the detected article for scanning the meshes on the detected surface to obtain the transverse and longitudinal mean stress values on each mesh node, calculates the equivalent stress values of the mesh nodes, and draws an uneven surface stress distribution cloud map of the detected article according to the equivalent stress values of the mesh nodes. The present invention provides a more accurate detection method for the surface stress detection of an assembly structure, and provides a theoretical reference for more accurately grasping the state level of the structural stress distribution and prolonging the service life of a machine tool.

DESCRIPTION OF DRAWINGS

To more clearly describe the technical solutions in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

DETAILED DESCRIPTION

The technical solutions in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

The present invention is described below in detail in combination with drawings and embodiments.

Figure 1:
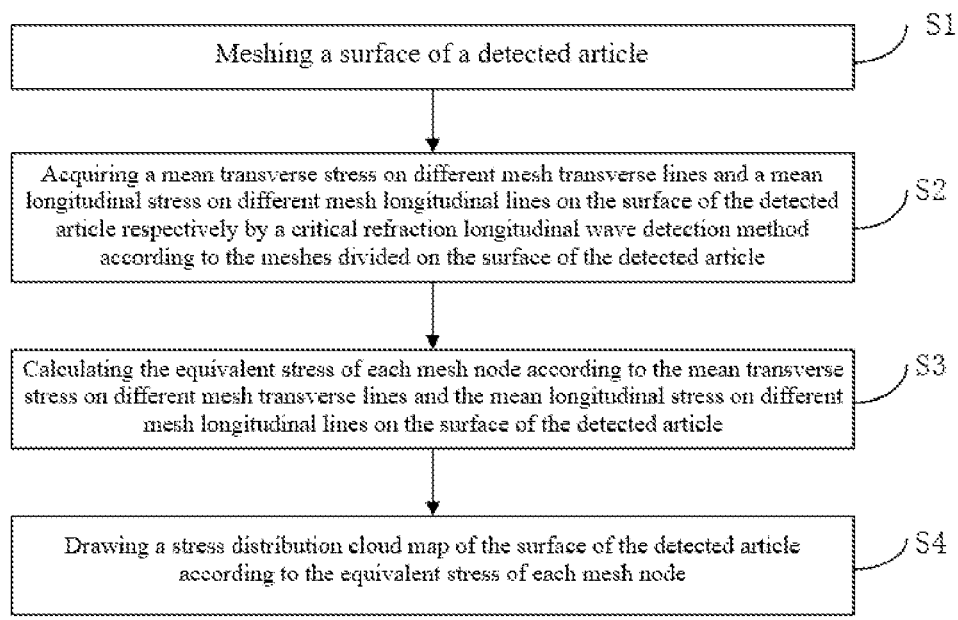
FIG. 1 is an implementation flow chart of a method provided by the present invention.

The present embodiment discloses a method for constructing a surface stress distribution cloud map based on critical refraction longitudinal wave detection. As shown in FIG. 1, the method comprises the following steps:

S1, dividing a surface of a detected article into meshes, wherein the meshes comprise a plurality of mesh transverse lines, a plurality of mesh longitudinal lines, and mesh nodes composed of the plurality of mesh transverse lines and the plurality of mesh longitudinal lines;

S2, acquiring a mean transverse stress on different mesh transverse lines and a mean longitudinal stress on different mesh longitudinal lines on the surface of the detected article respectively by a critical refraction longitudinal wave detection method according to the meshes divided on the surface of the detected article;

S3, calculating an equivalent stress of each mesh node according to the mean transverse stress on different mesh transverse lines and the mean longitudinal stress on different mesh longitudinal lines on the surface of the detected article;

S4, drawing a stress distribution cloud map of the surface of the detected article according to the equivalent stress of each mesh node.

Each step of the present invention is further described below through specific embodiments.

Figure 2:
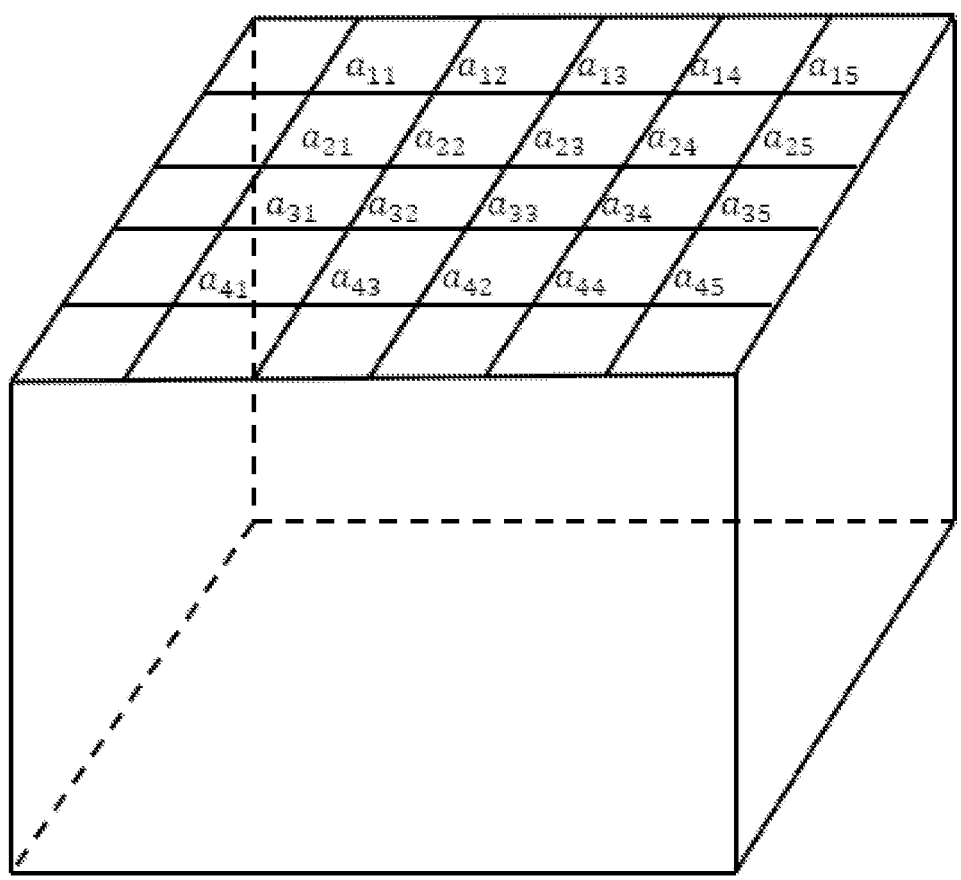
FIG. 2 is a schematic diagram of structural surface meshing of a detected article provided by an embodiment of the present invention.

The meshing of the surface of the detected article in step S1 mainly means that a flat surface of the detected article is selected, the flat surface of the detected article is divided into the meshes composed of the plurality of mesh transverse lines and the plurality of mesh longitudinal lines, the spacing between adjacent transverse lines and the spacing between adjacent longitudinal lines can be determined according to a size of a plane to be measured on the surface of the detected article, and the spacing is as small as possible to ensure that the mesh nodes defined by the mesh transverse lines and the mesh longitudinal lines are as many as possible. The meshes are shown in FIG. 2. In the figure, $\alpha11$, $\alpha12$, $\alpha21$, etc. represent nodes in the meshes.

Step S2 is used for acquiring a mean transverse stress on different mesh transverse lines and a mean longitudinal stress on different mesh longitudinal lines on the surface of the detected article respectively by a critical refraction longitudinal wave detection method according to the meshes divided on the surface of the detected article.

The transverse propagation duration of critical refraction longitudinal waves on different mesh transverse lines and the longitudinal propagation duration of critical refraction longitudinal waves on different mesh transverse lines on the surface of the detected article are mainly detected by the critical refraction longitudinal wave detection method; and then, the mean transverse stress on different mesh transverse lines and the mean longitudinal stress on different mesh longitudinal lines are obtained according to the stress calculation formulas of the critical refraction longitudinal waves.

Specific technical formulas are as follows:

$$\sigma_1 = B(t_1 - t_0) + \sigma_0$$

$$\sigma_2 = B(t_2 - t_0) + \sigma_0$$

in the formulas, $\sigma_1$ represents the corresponding mean transverse stress on a mesh transverse line, $t_1$ represents the transverse propagation duration of the critical refraction longitudinal wave on the mesh transverse line, $\sigma_2$ represents the corresponding mean longitudinal stress on a mesh longitudinal line, $t_2$ represents the longitudinal propagation duration of the critical refraction longitudinal wave on the mesh longitudinal line, B represents a stress-acoustic time difference coefficient corresponding to the detected article, $t_0$ represents the critical refraction longitudinal wave propagation duration corresponding to the detected article under the zero stress state, and $\sigma_0$ represents the zero stress corresponding to the detected article.

In the above step, the stress-acoustic time difference coefficient B corresponding to the detected article and the propagation duration $t_0$ of critical refraction longitudinal waves corresponding to the detected article under the zero stress state can be obtained through calibration detection of a zero stress specimen. Specific steps are as follows:

firstly, acquiring a zero stress specimen of the same material as the detected article;

secondly, arranging a transmitting probe and a receiving probe for critical refraction longitudinal wave detection on the surface of the zero stress specimen, and installing a wedge block of the transmitting probe and a wedge block of the receiving probe;

then, conducting a tensile test for the zero stress specimen to obtain an ultrasonic acoustic time-load relationship curve under different loads, and obtaining a stress-acoustic time difference coefficient corresponding to the zero stress specimen according to the ultrasonic acoustic time-load relationship curve, wherein the stress-acoustic time difference coefficient corresponding to the zero stress specimen is the stress-acoustic time difference coefficient corresponding to the detected article;

finally, conducting the critical refraction longitudinal wave detection of the zero stress specimen again to obtain the critical refraction longitudinal wave propagation duration corresponding to the zero stress specimen under the zero stress state, wherein the critical refraction longitudinal wave propagation duration corresponding to the zero stress specimen is the critical refraction longitudinal wave propagation duration corresponding to the detected article under the zero stress state.

Step S3 is used for calculating the equivalent stress of each mesh node according to the mean transverse stress on different mesh transverse lines and the mean longitudinal stress on different mesh longitudinal lines on the surface of the detected article.

In the present embodiment, the equivalent stress of each mesh node is solved by a Von Mises stress formula, with a specific formula as follows:

$$\sigma = \left[\frac{1}{2}(\sigma_1 - \sigma_2)^2 + (\sigma_2 - \sigma_3)^2 + (\sigma_3 - \sigma_1)^2\right]^{\frac{1}{2}}$$

in the formula, $\sigma$ represents the equivalent stress value of a mesh node, $\sigma_1$ represents the mean transverse stress corresponding to the mesh transverse line of the mesh node, $\sigma_2$ represents the mean longitudinal stress corresponding to the mesh longitudinal line of the mesh node, $\sigma_3$ represents the stress of the mesh node perpendicular to the direction of the surface of the detected article, and the value of $\sigma_3$ is zero in the present invention. Then, the equivalent stress values of all mesh nodes in the meshes are obtained according to the Von Mises stress formula.

Step S4 is used for writing a script file by Matlab software language in the present embodiment according to the obtained equivalent stress value of each mesh node, and constructing a surface stress distribution cloud map of the structure of the detected article.

As an improved embodiment, to verify the accuracy of the stress distribution cloud map obtained finally in the present invention, before step S4, the true stress value of each mesh node on the surface of the detected article is detected by a strain gauge, and the equivalent stress corresponding to each mesh node is verified according to the true stress value. Only when an error between the true stress value of each network node and the equivalent stress value of the node satisfies a set threshold, for example, only when the error between the true stress value and the equivalent stress value of the same mesh node is <10%, the network node is drawn into the surface stress distribution cloud map of the detected article.

The mean stress of different mesh transverse lines and longitudinal lines on the surface of the detected article is detected by the critical refraction longitudinal wave detection method in the present invention. The critical refraction longitudinal wave detection principle is as follows.

When the propagation direction of the longitudinal wave is parallel to the stress direction, the relationship between the longitudinal wave velocity and the stress is:

$$\rho_0 V_{11}^2 = \lambda + 2\mu + \frac{\sigma'}{3\lambda + 2\mu}\left[\frac{\lambda+\mu}{\mu}(4\lambda + 10\mu + 4m) + \lambda + 2m\right] \quad (1)$$

In the formula, $V_{11}$—wave velocity when the longitudinal wave propagation direction is parallel to the stress direction;
σ'—stress in a part to be detected;
$\rho_0$—material density;
λ and μ—second order elastic constant of the part to be detected;
m—third order elastic constant of the part to be detected.

When the part to be detected is in a free state, the internal axial stress is 0. At this moment, the wave velocity expression of the critical refraction longitudinal wave can be written in the following form:

$$\rho_0 V_{L0}^2 = \lambda + 2\mu \quad (2)$$

In the formula, $V_{L0}$—the propagation sound velocity of the longitudinal wave in the part to be detected under the zero stress state.

Formulas (1) and (2) are combined to obtain:

$$V_{11}^2 = V_{L0}^2(1+k\sigma) \quad (3)$$

In formula (3), k is a coefficient related to the second and third order elastic constants of the material, with an expression as follows:

$$k = \frac{\frac{4\lambda + 10\mu + 4m}{\mu} + \frac{2l - 3\lambda - 10\mu - 4m}{\lambda + 2\mu}}{3\lambda + 2\mu} \quad (4)$$

Formula (3) is expressed as a functional relationship between the stress and the sound velocity as follows:

$$\sigma' = \frac{1}{k} \cdot \left(\frac{V_{11}^2}{V_{L0}^2} - 1\right) \quad (5)$$

It can be seen that the axial stress of the part to be detected is a function of the critical refraction longitudinal wave velocity, and the second order Taylor expansion of formula (5) is conducted at $V_{11} = V_{L0}$ to obtain the following form:

$$\sigma = \frac{2}{k} \cdot \frac{V_{11} - V_{L0}}{V_{L0}} + \frac{3}{k} \cdot \frac{(V_{11} - V_{L0})^2}{V_{L0}^2} \quad (6)$$

Although the critical refraction longitudinal wave is the most sensitive to the stress, the change of the critical refraction longitudinal wave velocity under the action of the stress is still small. Test results indicate that the change of the critical refraction longitudinal wave velocity caused by 100 MPa stress is only 1%. Here, by a fixed acoustic range $L_0$ method, formula (6) can be transformed into:

$$\sigma = \frac{1}{k} \cdot \left(\frac{3t_{L0}^2}{t_{11}^2} - \frac{4t_{L0}}{t_{11}} + 1\right) \quad (7)$$

In the formula, $t_{L0}$—propagation acoustic time of the critical refraction longitudinal wave of the part to be detected under the zero stress state;
$t_{11}$—propagation acoustic time of the critical refraction longitudinal wave of the part to be detected under a stressed state;

Formula (7) is further simplified into the following form:

$$\sigma = \frac{2}{kt_{L0}}(t_{L0} - t_{11}) \quad (8)$$

Let:

$$K = \frac{k}{2} \quad (9)$$

In the formula, K—acoustoelastic constant.

The stress of the acoustoelastic constant is associated with the acoustic time, and formula (8) can be finally simplified as:

$$\sigma = B(t_{L0} - t_{11}) \quad (10)$$

wherein $$B = \frac{1}{Kt_{L0}} \quad (11)$$

In the formula, B—stress-acoustic time difference coefficient.

When the detected article is detected, to make the acoustic wave emitted by the probe have a certain incident angle, it is necessary to design and install the wedge block of the probe and determine the detection parameters of the wedge block. The detection parameters include the angle and a sound path. The angle ° 1L of the wedge block can be obtained by the following formula:

$$\theta_{1L} = \arcsin\left(\frac{V_{1L}}{V_{2L}}\right) \quad (12)$$

$V_{1L}$ is the wave velocity of ultrasonic wave in a first medium (air);
$V_{2L}$ is the wave velocity of ultrasonic wave in a second medium (a substance to be measured).

When the zero stress specimen is calibrated, it is necessary to apply a certain gradient of load to the specimen through a tensile testing machine, and record the corresponding ultrasonic wave reflection time. The ultrasonic acoustic time-load relationship curve is drawn to obtain the stress-acoustic time difference coefficient corresponding to the zero stress specimen. Because the material with zero stress time is the same as the material of the detected article, the stress-acoustic time difference coefficient corresponding to the zero stress specimen can be the stress-acoustic time difference coefficient corresponding to the zero stress specimen of the detected article.

Each embodiment in the description is described in a progressive way. The difference of each embodiment from each other is the focus of explanation. The same and similar parts among all of the embodiments can be referred to each other. For a device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

What is claimed is:

1. A method for constructing a surface stress distribution cloud map based on critical refraction longitudinal wave detection, comprising the following steps:

S1, dividing a surface of a detected article into meshes, wherein the meshes comprise a plurality of mesh transverse lines, a plurality of mesh longitudinal lines, and mesh nodes are defined by the plurality of mesh transverse lines and the plurality of mesh longitudinal lines;

S2, acquiring a mean transverse stress on different mesh transverse lines and a mean longitudinal stress on different mesh longitudinal lines on the surface of the detected article respectively by a critical refraction longitudinal wave detection method according to the meshes divided on the surface of the detected article; specifically comprising:

detecting a transverse propagation duration of critical refraction longitudinal waves on different mesh transverse lines on the surface of the detected article by the critical refraction longitudinal wave detection method;

calculating the mean transverse stress on the corresponding mesh transverse lines according to the transverse propagation duration of the critical refraction longitudinal waves on different mesh transverse lines, with a specific calculation formula as follows:

$$\sigma = B(t_1 - t_0) + \sigma_0$$

in the formula, $\sigma_1$ represents a corresponding mean transverse stress on a mesh transverse line, $t_2$ represents the transverse propagation duration of the critical refraction longitudinal wave on the mesh transverse line, B represents a stress-acoustic time difference coefficient corresponding to the detected article, $t_0$ represents the critical refraction longitudinal wave propagation duration corresponding to the detected article under a zero stress state, and $\sigma_0$ represents a zero stress corresponding to the detected article;

detecting the longitudinal propagation duration of critical refraction longitudinal waves on different mesh longitudinal lines on the surface of the detected article by the critical refraction longitudinal wave detection method;

calculating the mean longitudinal stress on the corresponding mesh longitudinal lines according to the longitudinal propagation duration of the critical refraction longitudinal waves on different mesh longitudinal lines, with a specific calculation formula as follows:

$$\sigma_2 = B(t_2 - t_0) + \sigma_0$$

in the formula, $\sigma_2$ represents the corresponding mean longitudinal stress on a mesh longitudinal line, $t_2$ represents the longitudinal propagation duration of the critical refraction longitudinal wave on the mesh longitudinal line, B represents a stress-acoustic time difference coefficient corresponding to the detected article, $t_0$ represents the critical refraction longitudinal wave propagation duration corresponding to the detected article under the zero stress state, and $\sigma_0$ represents the zero stress corresponding to the detected article;

S3, calculating the equivalent stress of each mesh node according to the mean transverse stress on different mesh transverse lines and the mean longitudinal stress on different mesh longitudinal lines on the surface of the detected article; specifically comprising:

solving the equivalent stress of each mesh node by a Von Mises stress formula according to the mean transverse stress on different mesh transverse lines and the mean longitudinal stress on different mesh longitudinal lines on the surface of the detected article, with a specific formula as follows:

$$\sigma = \left[\frac{1}{2}(\sigma_1 - \sigma_2)^2 + (\sigma_2 - \sigma_3)^2 + (\sigma_3 - \sigma_1)^2\right]^{\frac{1}{2}}$$

in the formula, $\sigma$ represents the equivalent stress value of a mesh node, $\sigma_1$ represents the mean transverse stress corresponding to the mesh transverse line of the mesh node, $\sigma_2$ represents the mean longitudinal stress corresponding to the mesh longitudinal line of the mesh node, $\sigma_3$ represents the stress of the mesh node perpendicular to the direction of the surface of the detected article, and the value of $\sigma_3$ is zero;

S4, drawing a stress distribution cloud map of the surface of the detected article according to the equivalent stress of each mesh node.

2. The method for constructing the surface stress distribution cloud map based on critical refraction longitudinal wave detection according to claim 1, wherein before step S2, the method further comprises the following steps:

acquiring a zero stress specimen of the same material as the detected article;

arranging a transmitting probe and a receiving probe for critical refraction longitudinal wave detection on the surface of the zero stress specimen, and installing a wedge block of the transmitting probe and a wedge block of the receiving probe;

conducting a tensile test for the zero stress specimen to obtain an ultrasonic acoustic time-load relationship curve under different loads, and obtaining a stress-acoustic time difference coefficient corresponding to the zero stress specimen according to the ultrasonic acoustic time-load relationship curve, wherein the stress-acoustic time difference coefficient corresponding to the zero stress specimen is the stress-acoustic time difference coefficient corresponding to the detected article;

conducting the critical refraction longitudinal wave detection of the zero stress specimen again to obtain the critical refraction longitudinal wave propagation duration corresponding to the zero stress specimen under the zero stress state, wherein the critical refraction longitudinal wave propagation duration corresponding to the zero stress specimen is the critical refraction longitudinal wave propagation duration corresponding to the detected article under the zero stress state.

3. The method for constructing the surface stress distribution cloud map based on critical refraction longitudinal wave detection according to claim 1, wherein before step S4, the method further comprises:

detecting the true stress value of each mesh node on the surface of the detected article by a strain gauge, and verifying the equivalent stress corresponding to each mesh node according to the true stress value.

4. The method for constructing the surface stress distribution cloud map based on critical refraction longitudinal wave detection according to claim 1, wherein step S4 specifically comprises:

drawing the stress distribution cloud map of the surface of the detected article by using Matlab software and according to the obtained equivalent stress of each mesh node.

\* \* \* \* \*